(12) United States Patent
Forristal

(10) Patent No.: US 8,055,767 B1
(45) Date of Patent: Nov. 8, 2011

(54) PROXY COMMUNICATION STRING DATA

(75) Inventor: Jeff Forristal, Elizabethton, TN (US)

(73) Assignee: Zscaler, Inc., Sunnyvale, CA (US)

( * ) Notice: Subject to any disclaimer, the term of this patent is extended or adjusted under 35 U.S.C. 154(b) by 139 days.

(21) Appl. No.: 12/173,108

(22) Filed: Jul. 15, 2008

(51) Int. Cl.
*G06F 15/173* (2006.01)

(52) U.S. Cl. ........ 709/224; 709/218; 709/223; 370/230; 370/401

(58) Field of Classification Search ........... 709/223–226
See application file for complete search history.

(56) References Cited

U.S. PATENT DOCUMENTS

| | | | |
|---|---|---|---|
| 6,643,694 B1 * | 11/2003 | Chernin | 709/223 |
| 7,130,806 B1 * | 10/2006 | Bera | 705/5 |
| 7,249,175 B1 * | 7/2007 | Donaldson | 709/225 |
| 7,272,642 B2 * | 9/2007 | Knight et al. | 709/218 |
| 7,552,200 B2 * | 6/2009 | Dodrill et al. | 709/219 |
| 7,603,409 B2 * | 10/2009 | Kobayashi et al. | 709/203 |
| 2002/0035498 A1 * | 3/2002 | Kehoe et al. | 705/8 |
| 2003/0126195 A1 * | 7/2003 | Reynolds et al. | 709/203 |
| 2003/0140140 A1 * | 7/2003 | Lahtinen | 709/224 |
| 2003/0217118 A1 * | 11/2003 | Kobayashi et al. | 709/218 |
| 2004/0044909 A1 * | 3/2004 | Mirza et al. | 713/201 |
| 2004/0257994 A1 * | 12/2004 | Paskett et al. | 370/230 |
| 2005/0138562 A1 * | 6/2005 | Carro | 715/734 |
| 2005/0256841 A1 * | 11/2005 | Rawat et al. | 707/1 |
| 2005/0261962 A1 * | 11/2005 | Chuah | 705/14 |
| 2006/0031404 A1 | 2/2006 | Kassab | |
| 2006/0218287 A1 * | 9/2006 | Dodrill et al. | 709/227 |
| 2007/0022092 A1 * | 1/2007 | Nishizawa et al. | 707/2 |
| 2007/0067348 A1 | 3/2007 | Andreyev | |
| 2007/0079366 A1 * | 4/2007 | Geffner | 726/12 |
| 2007/0192481 A1 * | 8/2007 | Wei et al. | 709/224 |
| 2007/0198647 A1 * | 8/2007 | Lingafelt et al. | 709/207 |
| 2007/0198688 A1 * | 8/2007 | Smedberg et al. | 709/223 |
| 2007/0233877 A1 * | 10/2007 | Qu et al. | 709/223 |
| 2007/0261112 A1 | 11/2007 | Todd et al. | |
| 2008/0104688 A1 * | 5/2008 | Paskett et al. | 726/12 |
| 2008/0137663 A1 * | 6/2008 | Gu et al. | 370/395.3 |
| 2008/0225871 A1 * | 9/2008 | Paskett et al. | 370/401 |
| 2009/0158030 A1 * | 6/2009 | Rasti | 713/156 |

OTHER PUBLICATIONS

Bowen, C. et al., "InformIT: Essential Windows Communication Foundation for .NET Framework 3.5: Programmable Web". Feb. 8, 2008. Retrieved from the internet: <http://www.informit.com/articles/article.aspx?p=1173045&seqNum-2>. Retrieved Jul. 14, 2008.

HTML 5 letter section. 2.3 URLs, pp. 29-36. Retrieved from the internet: <http://www.whatwg.org/specs/web-apps/current-work/html5-letter.pdf.>. Retrieved Jul. 14, 2008.

(Continued)

*Primary Examiner* — Wing Chan
*Assistant Examiner* — Razu Miah
(74) *Attorney, Agent, or Firm* — Clements Bernard PLLC; Lawrence A. Baratta, Jr.; Christopher L. Bernard

(57) ABSTRACT

Systems, methods and apparatus for a distributed security that detects proxied resource requests. The system can identify proxy strings, each of the proxy strings being indicative of a proper substring in a string of data constituting a proxy communication, the proxy communications being communications that are generated by processing systems executing a plurality of proxy applications. The proxy strings can be store and access to the stored proxy strings can be provided to facilitate detection of proxy communications for the one or more proxy applications in resource requests.

19 Claims, 7 Drawing Sheets

OTHER PUBLICATIONS

Anonymous Proxy Controls for Business. CYMPHONIX Smart Network, Smart Business. Retrieved from the internet: <http://www.cymphonix.com/SMBAnonymousProxies.html>. Retrieved Jul. 14, 2008.

dans.blog: CFMX UDF: Parsing a URI into a struct . . . Retrieved from the internet: <http://blog.pengoworks.com/index.cfm/2006/9/27/CFMX-UDF-Parsing-a-URI-into-a-struct>. Retrieved Jul. 14, 2008.

* cited by examiner

PROXY COMMUNICATION STRING DATA

CROSS-REFERENCE TO RELATED APPLICATION

This application is related to U.S. patent application Ser. No. 12/173,110 filed on Jul. 15, 2008, and entitled "String Based Detection of Proxy Communications", the entire disclosure of which is incorporated herein by reference.

BACKGROUND

This disclosure relates to security provisioning.

The prevalence and accessibility of computer networks requires security measures to protect valuable information and to ensure that users of the computer networks are using network resources in accordance with one or more security and usage policies. An enterprise, for example, can implement such security measures by use of a layered security system. Such a layered security system can be implemented at the network edge of the enterprise, e.g., firewalls, gateway security agents, etc. Additionally, a layered security system can also include security processes and agents that are implemented throughout the enterprises, e.g., virus scanning software on each computer device within the enterprise, content filtering software, content monitoring software, etc.

Such layered security systems are prone to processing inefficiencies and can require many resources within the enterprise to maintain the systems. For example, many layered security systems do not implement a distribution infrastructure to communicate and share content intelligence. This results in repeated processing of both good and bad content. Many layered security systems also cannot readily maintain a central data store of threat data that classifies content items such as files, uniform resource locators (URLs), and e-mails according to security classifications (e.g. virus, malware, spam mail, etc.).

Additionally, generating a consolidated security view of the enterprise is a difficult process, as this requires the collecting of data from different locations and user groups and arranging the data in a common time order before abstracting and generating reports. Due to disparity in the security products across locations, there is difficulty in capturing the information into a common format Finally, many of the existing security solutions have limited real-time or data mining capabilities. In particular, many of the existing security solutions have limited capabilities for detecting potentially surreptitious activities of users. For example, an entity, such as an enterprise, may define a list of prohibited resource locations, e.g., a list of prohibited URLs. However, users can attempt to access the prohibited resource locations by use of anonymous proxy servers. Such proxy servers service the requests of their clients by forwarding requests to other servers, such as the servers that are prohibited by the enterprise. Thus, by using a proxy server, a user can access prohibited web sites.

Some security systems can access a list of know proxy servers, e.g., a list of IP addresses associated with proxy servers, or the URLs of the proxy servers, and block HTTP requests and responses for the proxy servers, i.e., communication to or from the proxy servers. Traffic from these servers can be blocked by the security system. However, new proxy servers may appear or an address associated with an existing proxy server can change, and thus maintaining a list of all proxy servers for blocking capabilities is time consuming and expensive, and often not possible.

SUMMARY

In general, one aspect of the subject matter described in this specification can be embodied in methods that include the following actions in a processing node or a logging node: identifying resource requests external to addressed receiving devices and addressed transmitting devices of the resource requests; for each of the identified resource requests: determining if the resource request includes one of a plurality of regular expressions, each of the regular expressions being indicative of a corresponding string associated with corresponding proxy software; if the resource request is determined to match one of the plurality of regular expressions, then identifying the resource request as a proxy communication; and generating a security notification to instantiate a security process responsive to the proxy communication. Other implementations of this aspect include corresponding systems, apparatus, and computer program products.

Another aspect of the subject matter described in this specification can be embodied in methods that include the following actions in a processing node or a logging node: identify resource requests in data traffic to and from the external system; determine if an identified resource request matches one of a plurality of proxy strings, each of the proxy strings being indicative of a string pattern associated with corresponding proxy software; identify the resource request as a proxy communication if the resource request is determined to include one of the plurality of proxy strings; and generate a security notification to instantiate a security process responsive to the proxy communication. Other implementations of this aspect include corresponding systems, apparatus, and computer program products.

Another aspect of the subject matter described in this specification can be embodied in methods that include the following actions: identifying proxy strings, each of the proxy strings being indicative of a proper substring in a string of data constituting a proxy communication, the proxy communications being communications that are generated by processing systems executing a plurality of proxy applications; grouping the proxy strings according to the corresponding proxy applications, each grouping of proxy strings including the proxy strings that are generated by a processing system executing a corresponding proxy application; storing the groupings of proxy strings in a proxy string store; and providing access to the proxy string store to facilitate detection of proxy communications for the one or more proxy applications in resource requests. Other implementations of this aspect include corresponding systems, apparatus, and computer program products.

Another aspect of the subject matter described in this specification can be embodied in methods that include the following actions: identifying proxy strings, each of the proxy strings being indicative of a proper substring in a string of data constituting a proxy communication, the proxy communications being communications that are generated by processing systems executing a plurality of proxy applications; generating a regular expression from each of the proxy strings; storing regular expressions in a proxy string store; and providing access to the proxy string store to facilitate detection of proxy communications for the one or more proxy applications in resource requests. Other implementations of this aspect include corresponding systems, apparatus, and computer program products.

The subject matter described in this specification also includes other aspects. Additionally, one or more of the following advantages can be realized by implementations of the subject matter described in this specification. As many proxy servers use one or more of a finite set of proxy software applications to realize proxy functionality, the resulting proxy communications for each proxy software application have a portion of common data, e.g., common substrings. The detection of these strings in resource requests, e.g., HTTP requests and HTTP responses, can be used to identify proxy communications. Thus, lists of prohibited proxy servers need not be predetermined to monitor proxy server use and/or proxy server traffic. Instead, detection data (e.g., proxy strings or regular expressions) need only be updated when new or modified proxy software applications are released, which is a much more manageable and efficient maintenance requirement.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
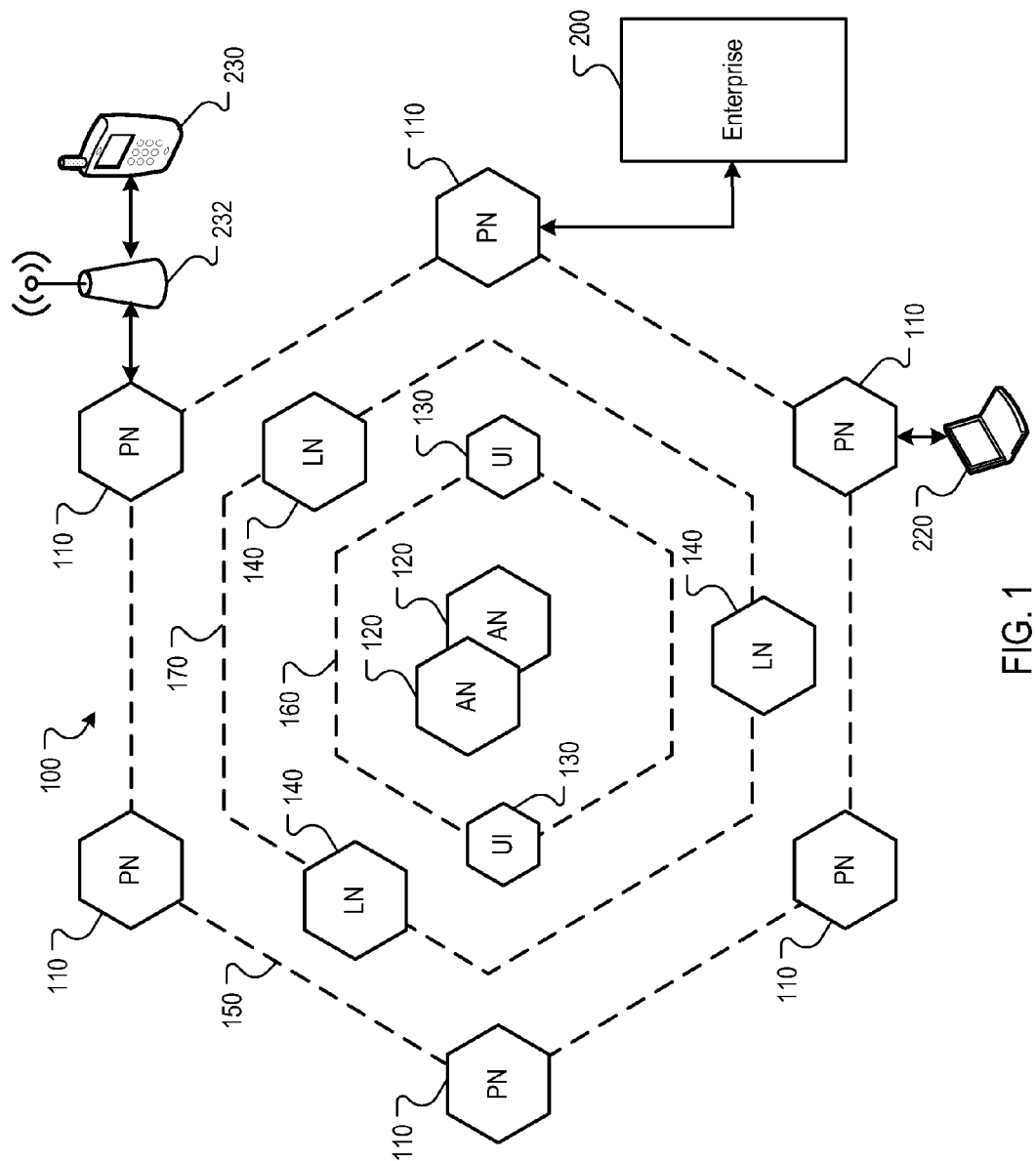
FIG. 1 is a block diagram of a distributed security system.

FIG. 1 is a block diagram of a distributed security system 100. The system 100 can, for example, be implemented as an overlay network in a wide area network (WAN), such as the Internet. The system 100 includes content processing nodes 110 that detect and preclude the distribution of security threats, e.g., malware, spyware, and other undesirable content sent from or requested by an external system. Example external systems can include an enterprise 200, a computer device 220, and a mobile device 230, or other network and computing systems.

§1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is process through a processing node 110.

Each processing node 110 can identify a threat classification, e.g., clean, spyware, malware, undesirable content, innocuous, unknown, etc. for content. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. A content item is violating if, at any processing node 110, any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communicate to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the access nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can be implemented by push and pull distribution schemes described in more detail below.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines and dictionaries for the processing nodes.

Other application layer functions can also be provided in the application layer, such as a user interface front-end 130. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network traffic processed by the processing nodes 110 for each external system. Each logging node 140 can perform various statistical operations and data mining on the stored data, such as analyzing web traffic for an enterprise 200, computer device 220, and/or mobile device 230.

In some implementations, the logging node 140 data can be anonymized so that data identifying an enterprise is removed or obfuscated. For example, identifying data can be removed to provide an overall system summary of security processing for all enterprises and users without revealing the identity of any one account. In another example, identifying data can be obfuscated, e.g., provide a random account number each time it is accessed, so that an overall system summary of security processing for all enterprises and users can be broken out by accounts without revealing the identity of any one account. In other implementations, the identifying data and/or logging node 140 data can be further encrypted, e.g., so that only the enterprise (or user if a single user account) can have access to the logging node 140 data for its account. Other processes of anonymizing, obfuscating, or securing logging node 140 data can also be used.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, choose one or both of these modes. For example, a browser may be configured to access a processing node 110 in a forward proxy mode. In the forward proxy mode, all accesses are addressed to processing node 110.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), IP security protocol (IPSec), or other protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected.

In another transparent proxy mode example, a protected system, such as the enterprise 200, may identify a processing node 110 as a next hop router for communication with the external servers.

§2.0 Example Detailed System Architecture and Operation

Figure 2:
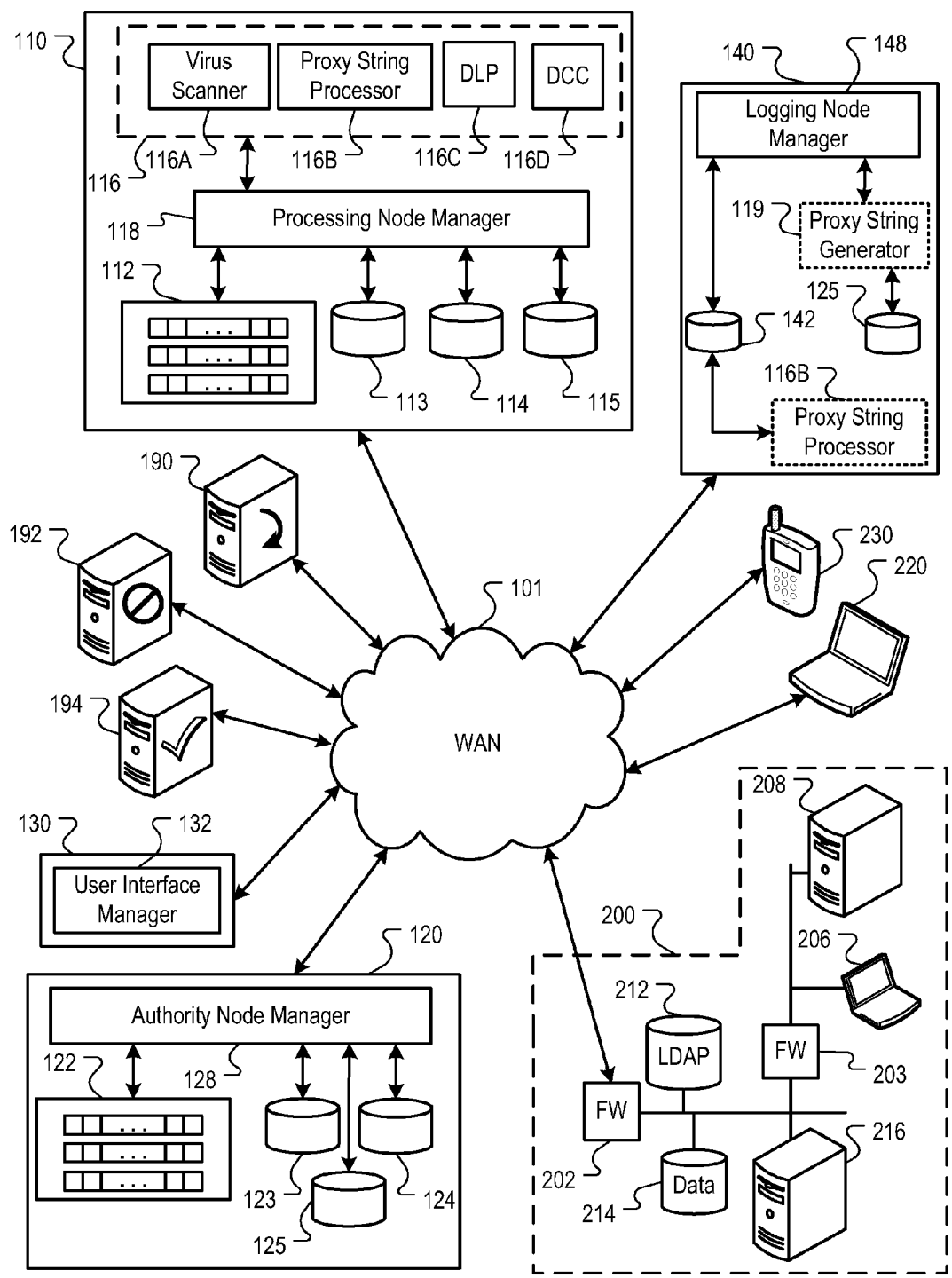
FIG. 2 is a block diagram of the system of FIG. 1 in which the components of FIG. 1 are illustrated in more detail.

FIG. 2 is a block diagram of the system of FIG. 1 in which the components of FIG. 1 are illustrated in more detail. Although only one representative component processing node 110, authority node 120 and logging node 140 are illustrated, there can be many of each of the component nodes 110, 120 and 140 present in the system 100.

A wide area network (WAN) 101, such as the Internet, or some other combination of wired and/or wireless networks, connects in data communication the processing node 110, authority node 120 and logging node 140. The external systems 200, 220 and 230 likewise communicate over the WAN 101 with each other or other data providers and publishers. Some or all of the data communication of each of the external systems 200, 220 and 230 can be processed through the processing node 110.

FIG. 2 also shows the enterprise 200 in more detail. The enterprise 200 can, for example, include a firewall 202 protecting an internal network that can include one or more enterprise servers 206, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 104 may store, for example, user login credentials for registered users of the enterprise 200 system. Such credentials can include a user identifiers, login passwords, and a login history associated with each user identifier. The other data 214 can include sensitive information, such as bank records, medical records, trade secret information, or any other information warranting protection by one or more security measures.

The computer device 220 and the mobile device 230 can also store information warranting security measures, such as personal bank records, medical information, and login information, e.g., login information to the server 206 of the enterprise 200, or to some other secured data provider server.

Also shown in FIG. 2 are an example proxy server 190, and two other servers 192 and 194. The first server, server 192, is a server that the enterprise 200 desires that users within the enterprise 200 be unable to access, e.g., a known phishing site, Trojan source, or otherwise objectionable location, malicious location, or some other location that can cause harm or lower employee productivity. The second server, server 194, is a server that the enterprise 200 does not prohibit access to, e.g., a news service, a government site, and the like.

§2.1 Example Processing Node Architecture and Operation

In some implementations, the processing nodes 110 are external to network edges of the external systems 200, 220 and 230. Each processing node 110 stores security policies 113 received from the authority node 120 and monitors content items requested by or sent from the external systems 200, 220 and 230. In some implementations, each processing node 110 can also store a detection process filter 112 and/or threat data 114 to facilitate the decision of whether a content item should be processed for threat detection. Additionally, each processing node 110 can also store proxy string detection data 115 that can be used to facilitate the detection of proxy communications for one or more proxy applications in resource requests, e.g., communications to or from the one or more proxy applications.

A processing node manager 118 can manage each content item in accordance with the security policy data 113, and the detection process filter 112 and/or threat data 114, if stored at the processing node 110, so that security policies for a plurality of external systems in data communication with the processing node are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" can be precluded. Those content items having an unknown status, e.g., content items that have not been processed by the system 100, can be threat detected to classify the content item according to threat classifications.

The processing node 110 can include data inspection engines 116. Each data inspection engine 116 can be configured to perform a threat detection process to classify content items according to a threat classification for a corresponding threat. For example, the data inspection engines can include a virus scanner engine 116A that can classify a content item as infected or clean, a proxy string processor 116B that can determine if a resource request, e.g., HTTP requests or resource locations, is a proxy request and classify the request as allowed or restricted, a data leakage protection (DLP) engine 116C that can identify a content item as secure or leaking, and a dynamic content categorization (DCC) engine 116D that can classify a content item as passed or failed.

The list of the data inspection engines 116A-116D is illustrative only; many other data inspection engines 116 can also be used, as can multiple instances of data inspection engines, e.g., different type data leakage engines implementing different data leakage algorithms. The calling of any particular data inspection engine 116 can be predicated on the type of content item to be threat detected. For example, a URL request from the enterprise 200 may cause the processing node manager 118 to call only the proxy string processor 116B.

Because the amount of data being processed by the processing nodes 110 can be substantial, the detection processing filter 112 can be used as the first stage of an information lookup procedure. For example, the detection processing filter 112 can be used as a front end to a looking of the threat data 114. Content items can be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence.

Each content item can have an information key that is hashed. For example, the processing node manager 118 may identify the URL address of a URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 can improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 can thus improve performance of queries where the answer to a request for information is usually negative. Such instances can include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information.

In some implementations, the detection processing filter 112 can be a Bloom filter implemented by a single hash function. The Bloom filter can be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§2.2 Example Authority Node Architecture and Operation

In general, the authority node 120 includes a data store that stores master security policy data 123 for each of the external systems 200, 220 and 230. An authority node manager 128 can be used to manage the master security policy data 123, e.g., receive input from users of each of the external systems defining different security policies, and can distribute the master security policy data 123 to each of the processing nodes 110. The processing nodes 110 then store a local copy of the security policy data 113.

The authority node 120 can also store a master detection process filter 122. The detection processing filter 122 can include data indicating whether content items have been processed by one or more of the data inspection engines 116 in any of the processing nodes 110. The authority node manager 128 can be used to manage the master detection processing filter 122, e.g., receive updates from a processing nodes 110 when a processing node 110 has processed a content item and updated the master detection processing filter 122. In some implementations, the master detection processing filter 122 can be distributed to the processing nodes 110, which then store a local copy of the detection processing filter 112.

In some implementations, the detection processing filter 122 can be a guard table. The processing node 110 can, for example, use the information in the local detection processing filter 112 to quickly determine the presence and/or absence of information, e.g., whether a particular URL has been checked for malware; whether a particular executable has been virus scanned, etc.

The authority node 120 can also store master threat data 124. The master threat data 124 can classify content items by threat classifications, e.g., a list of known viruses, a list of known malware sites, spam e-mail domains, etc. The authority node manager 128 can be used to manage the master threat data 124, e.g., receive updates from a processing nodes 110 when a processing node 110 has processed a content item and update the master threat data 124 with any pertinent results. In some implementations, the master threat data 124 can be distributed to the processing nodes 110, which then store a local copy of the threat data 114.

The authority node 120 can also store master proxy string detection data 125. The master proxy string detection data 125 can be provided to the processing nodes 110 as the proxy string detection data 115.

In some implementations, the authority node 120 can also monitor the health of each processing node 110, e.g., the resource availability in each processing node 110, detection of link failures, etc. Based on the observed health of each process node 110, the authority node 120 can redirect traffic among processing nodes 110 and/or balance traffic among the processing nodes 110. Other remedial actions and processes can also be facilitated by the authority node 110.

§2.3 Example Processing Node and Authority Node Communications

The processing node 110 and the authority node 120 can be configured according to one or more push and pull processes to manage content items according to security policy data 113 and/or 123, detection process filters 112 and/or 122, the threat data 114 and/or 124, and the string detection data 115 and/or 125.

§2.4 Proxy Communication Management

A resource request, such as an HTTP request issued by a web browser on a client device, typically contains data that is used to designate a file or a dynamic resource on a remote server. However, the HTTP request is not limited to merely designating a file or a dynamic resource; the request can conceptually contain arbitrary data, the contents and applicability of this arbitrary data can widely vary.

One use for this arbitrary data is to include a secondary resource request identifier, e.g., a URI (which can be a URL), that serves to identify a different web address/location, such as the location of the prohibited server 192. Such resource requests are often generated and used by external proxy servers, e.g., the proxy server 190.

To detect anonymous web surfing, the proxy string processor 116B of a processing node 110 can determine whether resource requests are proxy communications. These resource requests include those requests that are addressed to receiving devices, e.g., client devices in the enterprise 200, or the user devices 220 and 230, and/or addressed to the proxy server 190.

In some implementations, the proxy string processor 116B can make this determination by inspecting various parts of the resource request for proxy strings. If a proxy string is determined to match within the resource request, the proxy string processor 116B identifies the resource request as a proxy communication and generates a security notification that can instantiate a security process responsive to the proxy communication, e.g., a filtering operation by the processing node manager 118.

A proxy string is a string of data that is indicative of a string pattern associated with corresponding proxy software. Most anonymous proxy applications are either direct or derived incarnations of a finite set of popular anonymous proxy application software packages. Each of these applications may generate one or more proxy strings in each proxy communication they generate. Detection is based on the use of a string expression to match against various data and control elements of the resource request, e.g., for an HTTP request and response, these data and control elements include the body, the URL request path, etc.

An example detection expression can cause the proxy string processor 116B to search for the string expression "/x-proxy/start/" within the URL path of the request; the presence of such a string value indicates the likely use of CGIProxy, a popular anonymous proxy web application software package. Other examples are provided in Table 1 below.

TABLE 1

Example Proxy Strings For Associated Proxy Applications

| Proxy Application | Proxy String or Regular Expression | Example Proxy Communication Resource Request |
| --- | --- | --- |
| CGI Proxy | /nph-proxy.+/0 | www.example1proxy.com/nph-proxy.pl/000000A/http/www.url.com/ |
| PHProxy | /index.php?go=aHR0 | example2proxy.com/index.php?go=aHR0cDovL3d3dy5NeVNwYWNILmNvbQ%3D%3D&hl=2ef |
| Surrogafier | ?js_regexps_framed | www.example3proxy.com/index.php?js_regexps_framed |
| Zelune | ?__new_url=aHR0 | example4proxy.com/?__new_url=aHR0cDovL3d3dy5teXNwYWNILmNvbS8= |
| cURLproxy | "/aHR0.+/69/0/ | example5proxy.com/Y29t/bXlzcGFjZQ/dXM/aHR0cDovL3VzLm15c3BhY2UuY29tLw/69/0/ |

The ".+" in the proxy string column of table 1 is a metacharacter operator specifying a corresponding search condition of "one or more characters." Other operators can also be used.

Table 1 lists only a some example proxy applications and associated proxy strings and regular expressions; many more proxy applications are available and can be associated with corresponding proxy strings that signal the characteristic communications. Because many sites on the Internet use one or more of these plurality of proxy applications, the proxy string processor 116B can dynamically identify the proxy communications, and thereby the publicly accessible anonymous proxies, by detecting these software applications through the characteristics they exhibit in their resource requests.

The popularity and/or number of proxy applications can change over time; additionally, new versions of the individual applications can be released at any point in time. Thus the list of proxy strings can likewise vary over time as new anonymous proxy web applications are updated, released, retired, etc. These strings and associated proxy applications can be stored in the master proxy string detection data 125 and distributed to the processing nodes as local proxy string detection data 115.

§2.4.1 Proxy String Detection Data

To detect the presence of proxy communications in resource requests, the proxy string processor 116B accesses proxy string detection data 115 stored in a data store. The proxy string detection data 115 can, in some implementations, store only the proxy strings associated with proxy applications. In some implementations, the proxy strings can be grouped according to the proxy applications, and these associated groupings can be stored in the proxy string data. In these implementations, the proxy string processor 116B can not only identify a proxy communication, but can also identify the type of proxy application associated with the proxy communications.

In other implementations, the proxy string detection data 115 can store only the regular expressions representative of string patterns associated with the proxy applications. Likewise, in some implementations, the regular expressions can be grouped according to the proxy applications, and these associated groupings can be stored in the proxy string detection data 115. In still additional implementations, combinations of proxy string data, regular expressions, and associations can be stored in the proxy string detection data 115.

In some implementations, a proxy string generator 119 can be used to identify a substring of string data in a proxy communication that is indicative of a particular proxy application. An example proxy string generator 119 is depicted in the logging node 140 of FIG. 2, and can communicate with the logging node manager 148 to mine log data 142 associated with proxy requests. In some implementations, the data that is logged can be known proxy communications, e.g., known proxy servers can be identified, or associated proxy applications can be obtained, either by purchase or free of charge, and a series of proxy requests and responses can be logged by an agent, e.g., a software robot.

After the proxy communications are collected, the proxy string generator 119 can identify static strings associated with each proxy application. For example, during a data mining operation, the proxy string generator 119 may detect the following strings generated by the Zelune proxy application:
example1proxy.com/
?_new_url=aHR0cDovL3d3dy5teXNwYWNILmNvbS8=
example2proxy.net/
?_new_url=aHR0cDovL3d3dy5mci5jb20=
example3proxy.net/
?_new_url=aHR0cDovL3d3dy5leGFtcGxIMi5jb20=
example4proxy.biz/
?_new_url=aHR0cDovL2Fzay5jb20NCg==
Based on these strings, the proper substrings of /?_new_url=aHR0cDovL can be identified. Such substrings can be identified based on their static characteristic, i.e., the strings are static in all of the proxy communications, or a large portion of the proxy communications. In some implementations, the static strings proper substrings that have a frequency of occurrence that exceeds a proxy string occurrence threshold, the proxy string occurrence threshold being a percentage of communications related to the proxy application in which all the strings are present, e.g., 20%. Higher or lower percentages can be used, depending on error tolerances, such as false positive or false negatives.

Additionally, in some implementations, encoding logic can be applied to shorten such strings. For example, common prefixes for a resource request identifier include "http://", "https://" and "www." The encoded prefix data "aHR0cDov", "aHR0cHM6" and "d3d3" respectively represent the prefixes in Base64, while the encoded prefix data "687474703a2f2f", "68747470733a2f2f" and "7777772e" respectively represent the prefixes in Base16. Thus, a representative proxy string can be shorted to "/?_new_url=aHR0" or even "/?_new_url=".

A proxy application may have more than one representative substring, e.g., for a particular proxy application, a first substring may be present in percentage of first proxy communications in excess of the proxy string occurrence threshold, and a second substring may be present in percentage of second proxy communications in excess of the proxy string occurrence threshold. Accordingly, the proxy string generator 119 can associate these identified proxy strings with the corresponding proxy application. These identified proxy strings and associations can be stored in the master proxy string detection data 125 and provided to the authority node 120 for distribution to the processing nodes 110.

In some implementations, regular expressions can also be generated from identified proxy strings. A regular expression is an expression that is used to identify strings of text, such as characters or patterns of characters. For example, the proxy string:
/nph-proxy.pl/0
can be represented by the regular expression:
/nph-proxy.+/0
To generate a regular expression, the proxy string generator 119 identifies communications for a particular proxy application having a common substring, such as the following proxy communications:
example1proxy.com/Y29t/bXlzcGFjZQ/dXM/
aHR0cDovL2EuY29t/69/0/
example2proxy.net/Y29t/bXlzcGFjZQ/dXM/
aHR0cDovL2IuY29t/69/0/
example3proxy.net/Y29t/bXlzcGFjZQ/dXM/
aHR0cDovL2MuY29t/69/0/
example4proxy.org/Y29t/bXlzcGFjZQ/dXM/
aHR0cDovL2QuY29t/69/0/
Using the base 64 encoding scheme, the proxy string generator 119 can identify the encoded URLs that begin with the encoded "http://" string. Accordingly, the regular expression "/aHR0.+/69/0/" can be generated from the identified substrings in the proxy communications. Additionally, portions of the substrings can be omitted to decrease later search processing times. For example, the prefix portions "dXM/" can be omitted. Alternatively, such omissions can be based on omitting artifacts of administrator-defined options that are defined by an administrator of the proxy server, as such portions of the strings may not be in all proxy communications for a particular proxy application.

As with the proxy strings, the regular expressions can also be associated with corresponding proxy applications and stored in the master proxy string store.

Although the proxy string generator 119 has been described as being implemented in the logging node 140, the proxy string generator 119 need not be implemented as part of the security system 100; instead, the proxy string generator 119 can be implemented in a separate system. For example, a third party can use the proxy string generator 119 and provide the resultant proxy string detection data 125 to the security system 100 for a fee or as part of an update service.

In other implementation, identification of static strings for associated proxy applications can be accomplished by manual inspection of source code. Source code for many of the proxy applications may be publicly available, and inspection of the source code can identify static strings that will be placed in the generated proxy communications. These static strings that are found manually can be subsequently processed, e.g., stored in the proxy string detection data 125 and/or used to generate regular expressions that are stored in the proxy string detection data 125.

§2.4.2 Detection of Proxy Communications

In some implementations, the proxy string detection data can be used to monitor and detect proxy communications received at the processing node 110 in real-time. For example, the proxy string processor 116B in the processing nodes 110 can compare HTTP requests and responses to the string detection data 115 to determine if a received HTTP request or HTTP response is a proxy communication.

In other implementations, the proxy string detection data can be used to mine data logs to detect previous use of proxy servers. For example, the proxy string processor 116B can be implemented in the logging node 140, and the logging node 140 can access the master proxy string detection data 125 from the authority node 120 (or, alternatively, store a local copy of the proxy string detection data 125). The logging node 140 can log resource requests, and other transactions, as log data 142 by use of a logging node manager 148. The log data can be readily accessed by the user interface front-end 130. For example, a user interface manager 132 can be used to generate log reports, execute security scenarios, monitor network traffic, etc. In these implementations, reports on proxy usage, such as the number of proxy communications detected, the number of disallowed requests, and the users associated with the requests, can be provided by use of the proxy string processor 116B.

In some implementations, the proxy string processor 116B can search the resource requests by use of one or more string search algorithms when searching based on proxy strings. For example, a Rabin-Karp search algorithm, finite state automaton search algorithm, a Knuth-Morris-Pratt search algorithm, Boyer-Moore search algorithm, or a Bitap search algorithm can be used. Other string search algorithms can also be used.

In some implementations, the proxy string processor 116B can search the resource requests by use of one or more regular expression search algorithms when searching based on regular expressions. Example search algorithms include a deterministic finite state machine algorithm, a nondeterministic finite state machine algorithm, or a combination of both algorithms. Other regular expression algorithms can also be used.

In either operative implementation, the string processor 116B can identify resource requests, e.g., HTTP requests and responses, and apply the plurality of proxy strings and/or regular expressions to both the entirety of the HTTP request data and HTTP response data to identify the resource requests that include a substring that matches one or more of the plurality of proxy strings and/or regular expressions.

Other processes for identifying proxy communications can also be used. In some implementations, the proxy string processor 116B can determine a corresponding string window for each of the proxy strings and incrementally traverse a resource request with each corresponding string window. For each traversal, the proxy string processor 116B can determine if each corresponding string window includes data matching its corresponding proxy string data.

For example, for the proxy string data "?_new_url=aHR0", a string window of 15 characters can be created. The string window is a circular buffer, and is used to traverse each resource request. For the following identified request:
example4proxy.com/
?_new_url=aHR0cDovL3d3dy5IeGFtcGxILmNvbQ==
the string window is initially filled with "example4proxy.c". As this does not match the proxy string "?_new_url=aHR0", the identified request is incrementally traversed by the proxy string processor 116B, and the window is updated to include "xample4proxy.co". Incrementing continues until the string window includes "?_new_url=aHR0". As a result of the matching of the data in the string window matching the proxy string ""?_new_url=aHR0", the proxy string processor 116B classifies the resource request as a proxy communication.

In some implementations, more than one character can be incrementally traversed. For example, if none of the characters in a string window correspond to proxy string data, the string window can be fully advanced to another set of new characters. Furthermore, although only one string window was described, multiple string windows for different proxy strings can be processed in parallel.

If a match is found, the proxy string processor 116B classifies the resource request as a proxy communication and a security notification to instantiate a security process responsive to the proxy communication is generated.

§2.5 Security Processes Responsive to Proxy Communications

In some implementations, in response to the detection of a proxy communication, the processing node manager 118 can automatically block the proxy communication. For example, if use of a proxy server is forbidden, then the policy data 113 for an enterprise or a user account will specify that all proxy communications are to be blocked. The processing node manager 118, in turn, precludes further transmission of the identified proxy communications.

In other implementations, other security processes responsive to the proxy communication can be implemented. For example, only a portion of proxy communications might be blocked, depending on the content of the proxy communication. For example, if the policy data 113 for an enterprise or a user account allows the use of a proxy server, e.g., proxy server 190, but also specifies a list of prohibited URIs, the embedded URI of the proxy communication can be compared to the list of prohibited URIs. Thus, in some implementations, the proxy string processor 116B and the processing node manager 118 can be used to detect and handle anonymous proxy usage. For example, if use of anonymous proxy servers is not forbidden, then for each detected proxy communication, an embedded URL can be identified, either explicitly or by use of a Base64, Base 32 or Base 16 decoding algorithm. The embedded URL may then be compared to the security policy data 113 to determine whether to allow or block the resource request.

For example, the enterprise may block the URL www.example.com, which is the URL associated with a server 192. Users may try to access the URL by use of the proxy server 190, e.g., the resulting request is:
example4proxy.com/
?_new_url=aHR0cDovL3d3dy5IeGFtcGxILmNvbQ==
As this request includes a substring that matches the proxy string "?_new_url=aHR0", the proxy string processor 116B identifies the resource request as a proxy communication. The proxy string processor 116B can, in some implementations, then decode and compare the embedded resource request identifier to the policy data 113 to classify the proxy communication according to a security policy associated with a device to which the resource request is addressed. Based on this classification, i.e., "violating," the processing node manager 118 can perform a filtering operation in response to the proxy communication.

Example filtering operations for proxy communications that are classified as violating a policy can include removing the embedded resource request identifier from the resource request, and allowing the resource request to be transmitted to the server to which it is addressed; or precluding transmission of the proxy communication; or substituting an alerting resource request identifier for the embedded resource request identifier. For the latter filtering process, the alerting resource request identifier can specify a resource request that causes alerting content to be provided to the client device to which the resource request is addressed. Example alerting content can be a warning page provided from the processing node 110; or some other content to make the user of the client device aware of the detection of the use of a proxy server and the violating embedded resource request.

In some implementations, the processing node manager 118 can block the HTTP request to the proxy server and issue and HTTP redirect response that directs the client device to the alerting content. In this implementation, traffic between the processing node 110 and the proxy server 190 is reduced, as requests that include restricted resource request identifiers are blocked from transmission to the proxy server 190.

In some implementations, the processing node manager 118 (or logging node manager 148, if mining logged data 142) can associate a user device with resource requests that are directed to or received from the user device. The processing node manager 118 (or logging node manager 148) can generate a blocking count for the user device, the blocking count being a count of filtering operations that resulted in preclusion of an embedded resource request identifier or preclusion of a proxy communication. In some implementations, the processing node manager 118 (or logging node manager 148) can preclude all resource requests to a user device having an associated blocking count that exceeds a threshold count. Such measures can be implemented to guard against surreptitious programs hijacking a client device, or to restrict access from a user that is ignoring or abusing an enterprise's network policies, etc.

Other security processes can also be initiated by the processing node manager 118, such as sending an alert to one or more administrators or recording a log entry, or counting the number of proxy communications and determining a percentage of traffic that constitutes proxy communications, to name just a few.

By initiating remedial or security processes based on the classification of a resource request as a proxy communication, or based on the classification of an embedded resource request identifier, users can still be allowed to use a proxy server 190 for non-violating actions. For example, access to the server 194 may be allowed according to the policy data, and a user device accessing the server 194 directly or by use of the proxy server 190 does not result in a security policy violation. Thus, the processing node manager 118 and the proxy string processor 116B can effectively preclude unauthorized access of anonymously proxied web sites, e.g., server 194, based on detecting when the user is trying to use an anonymous proxy web site to access a URL that is normally blocked. The processing node manager 118 and the proxy string processor 116B can still allow a user to utilize an anonymous proxy web site to access a URL that the user is normally allowed to access.

Furthermore, lists of prohibited proxy servers need not be stored to monitor proxy server use and/or proxy server traffic. Instead, detection data (e.g., proxy strings or regular expressions) need only be updated when new or modified proxy software applications are released, which is a much more manageable and efficient maintenance requirement.

03.0 Example Processes

Figure 3:
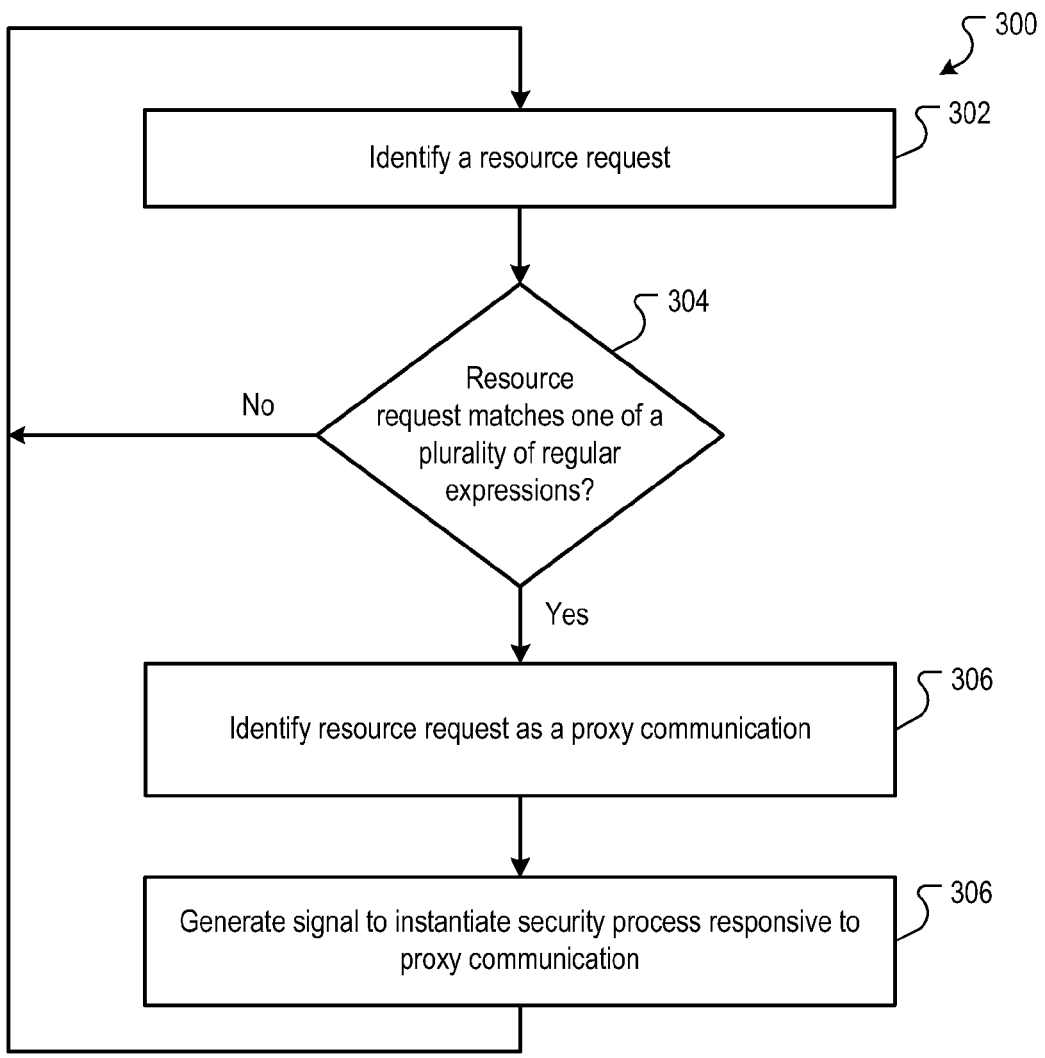
FIG. 3 is a flow diagram of an example process for detecting proxy communications.

FIG. 3 is a flow diagram of an example process 300 for detecting proxy communications. The process 300 can, for example, be used in the proxy string processor 116B of FIG. 2 and can be used to monitor traffic in real time, or can be used to process traffic logs.

The process 300 identifies a resource request (302). For example, the proxy string processor 116B can identify HTTP requests or responses directed to client devices in an enterprise, such as the enterprise 200.

The process 300 determines if the resource request matches one of a plurality of regular expressions (304). For example, the proxy string processor 116B can use a regular expression matching algorithm to determine if a resource request includes a string pattern indicative of corresponding proxy software.

If the process 300 determines that the resource request does not match one of a plurality of regular expressions, then the process 300 identifies another resource request (302). Conversely, if the process 300 determines that the resource request does match one of a plurality of regular expressions, then process 300 identifies the resource request as a proxy communication (306). For example, the proxy string processor 116B can identify a resource request that matches the regular expression "/nph-proxy.*/" as a proxy communication.

The process 300 generates a signal to instantiate a security process responsive to the proxy communication (308). For example, the proxy string processor 116B can pass the resource request to the processing node manager 118, which can, in turn, compare the resource request to the policy data 113 and take any necessary actions.

Thereafter, the process 300 identifies another resource request (302).

Figure 4:
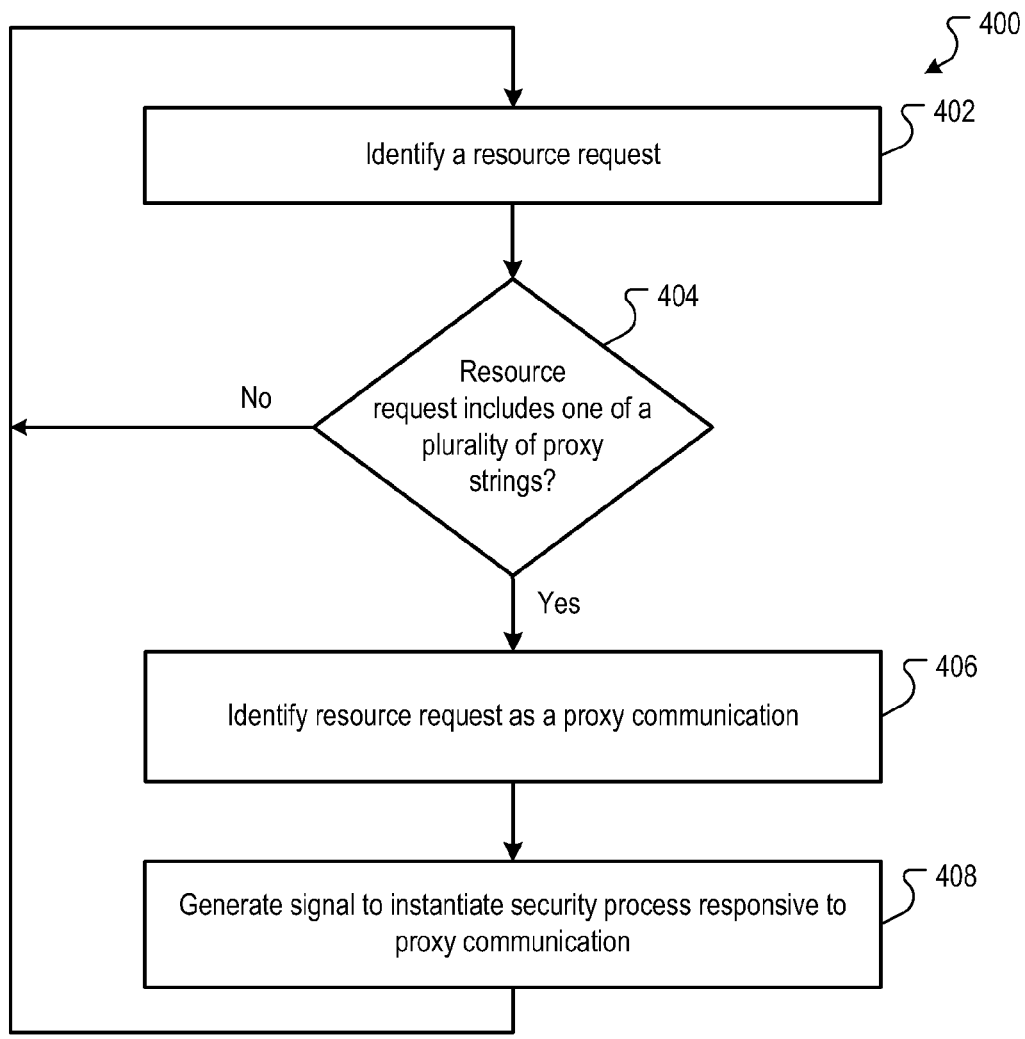
FIG. 4 is a flow diagram of an example process for detecting proxy communications.

FIG. 4 is a flow diagram of an example process for detecting proxy communications. The process 400 can, for example, be used in the proxy string processor 116B of FIG. 2 and can be used to monitor traffic in real time, or can be used to process traffic logs.

The process 400 identifies a resource request (402). For example, the proxy string processor 116B can identify HTTP requests or responses directed to client devices in an enterprise, such as the enterprise 200.

The process 400 determines if the resource request includes one of a plurality of proxy strings (404). For example, the proxy string processor 116B can use a string matching algorithm to determine if a resource request includes the proxy string "/index.php?go=aHR0".

If the process 400 determines that the resource request does not include one of a plurality of proxy strings, then the process 400 identifies another resource request (402). Conversely, if the process 400 determines that the resource request does include one of a plurality of processing strings, then process 400 identifies the resource request as a proxy communication (406). For example, the proxy string processor 116B can identify a resource request that includes the proxy string "/index.php?go=aHR0" as a proxy communication.

The process 400 generates a signal to instantiate a security process responsive to the proxy communication (408). For example, the proxy string processor 116B can pass the resource request to the processing node manager 118, which can, in turn, compare the resource request to the policy data 113 and take any necessary actions. Thereafter, the process identifies another resource request 402.

Figure 5:
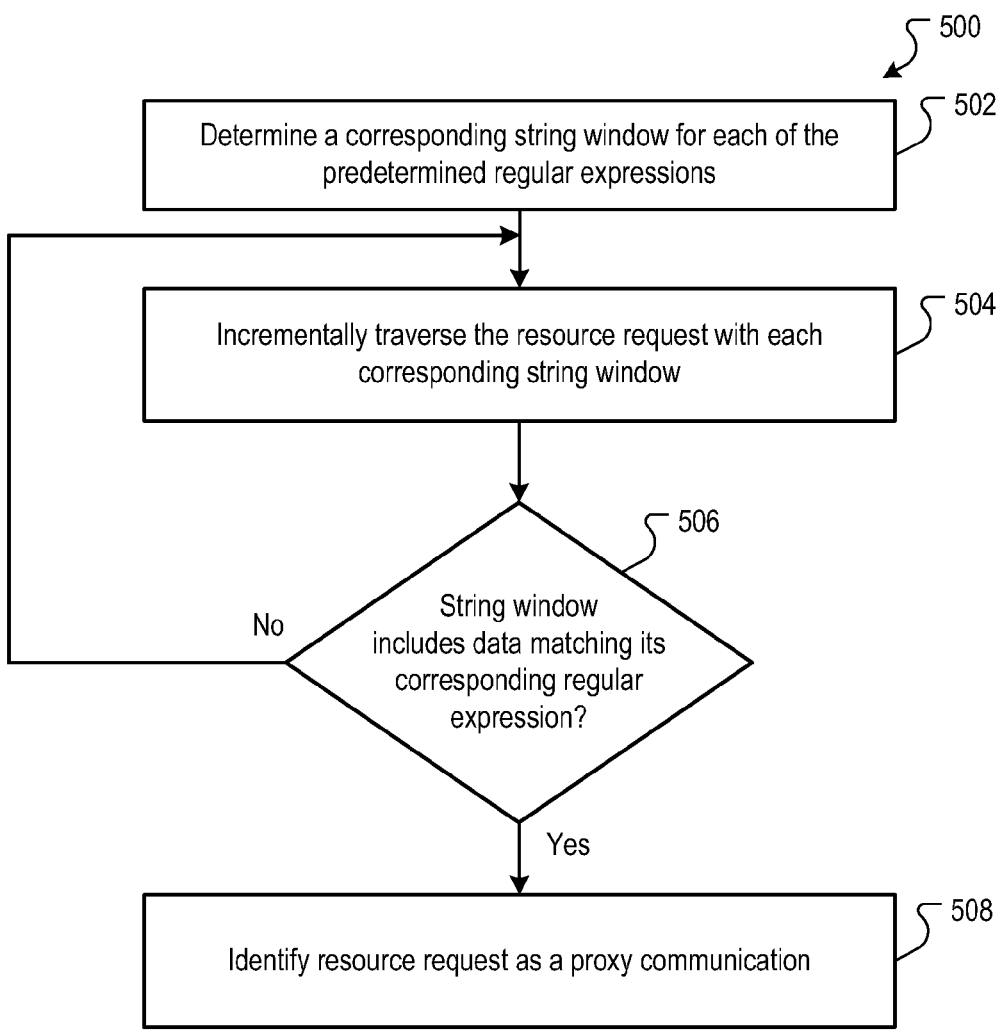
FIG. 5 is a flow diagram of an example process for detecting proxy communications.

FIG. 5 is a flow diagram of an example process for detecting proxy communications. The process 500 can, for example, be used in the proxy string processor 116B of FIG. 2 and can be used to monitor traffic in real time, or can be used to process traffic logs.

The process 500 determines a corresponding string window for each predetermined regular expression (502). For example, the proxy string processor 116B can determine the proxy string data "?_new_url=aHR0" has a string window of 15.

The process 500 incrementally traverses the resource request with each corresponding string window (504). For example, the proxy string processor 116B, for the following identified request:

example4proxy.com/
?_new_url=aHR0cDovL3d3dy5IeGFtcGxILmNvbQ==
can initially fill the string window with "example4proxy.c".

The process 500 determines if the string window includes data matching its corresponding regular expression (506). For example, the proxy string processor can determine if the string window data of "example4proxy.c" matches "?_new_url=aHR0". the identified request is incrementally traversed by the proxy string processor 116B, and the window is updated to include "xample4proxy.co".

If the process 500 determines the string window does not include data matching its corresponding regular expression, then the process 500 continues to incrementally traverse the resource request (504). The process, in subsequent negative determinations, continues to incrementally traverse the resource request until the resource request is fully processed, i.e., no additional increments can be made.

If the process 500 determines the string window does include data matching its corresponding regular expression, then the process 500 identifies the resource request as a proxy communication (508). For example, the proxy string processor 116B will increment through the resource request until the string window includes the data "?_new_url=aHR0". As a result of the matching of the data in the string window matching the proxy string "?_new_url=aHR0", the proxy string processor 116B classifies the resource request as a proxy communication.

Figure 6:
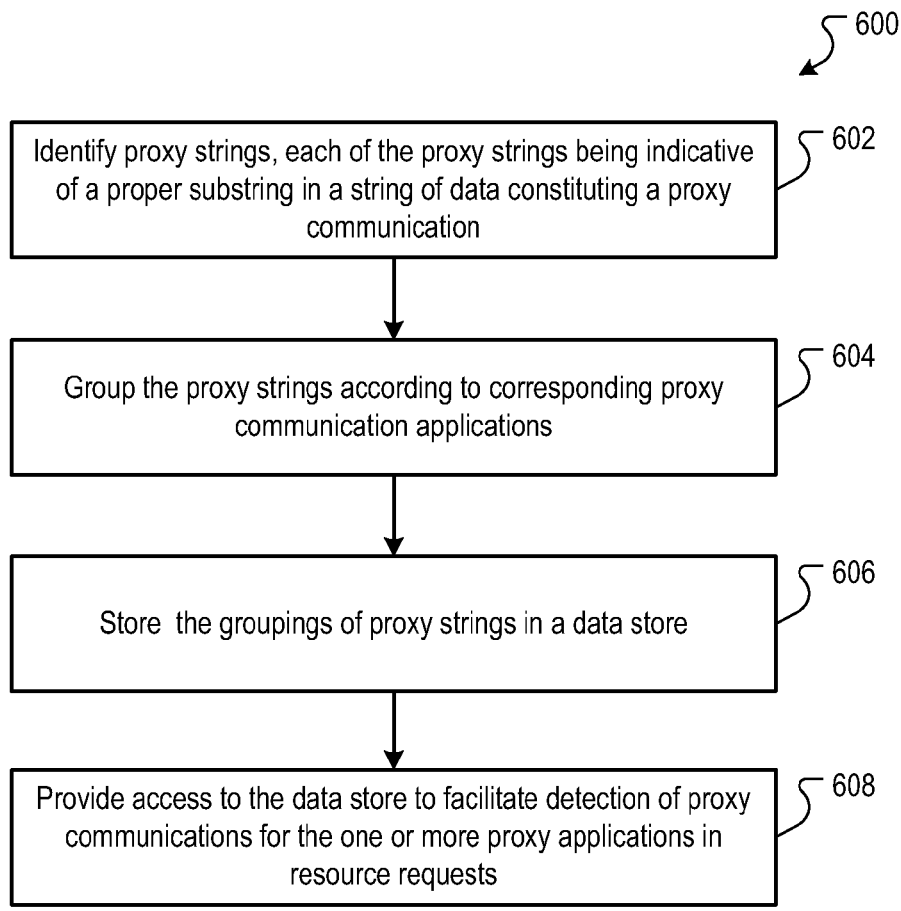
FIG. 6 is a flow diagram of an example process for identifying proxy strings for use in detecting proxy communications.

FIG. 6 is a flow diagram of an example process 600 for identifying proxy strings for use in detecting proxy communications. The process 600 can, for example, be used in the proxy string generator 119 of FIG. 2, which can be used in a logging node 140 or some other processing device that can access or receive resource requests.

The process 600 identifies proxy strings, each of the proxy strings being indicative of a proper substring in a string of data constituting a proxy communication (602). For example, the proxy string generator 119 can identify the string "/?_new_url=aHR0" as a proxy string if the string is observed in a number of proxy communications for a proxy application that exceed a frequency threshold, e.g., present in more than 25% of all proxy communications generated by that proxy application.

The process 600 groups the proxy string according to corresponding proxy applications (604). For example, the proxy string generator 119 can group two or more proxy strings identified for a proxy application into a grouping.

The process 600 stores the groupings of proxy strings in a data store (606). For example, the proxy string generator 119 can store the groupings in the proxy string detection data 125.

The process 600 provides access to the data store (608). For example, the proxy string generator 119 can provide access to the proxy string detection data 125 by pushing the proxy string detection data 125 to the authority node 120.

Figure 7:
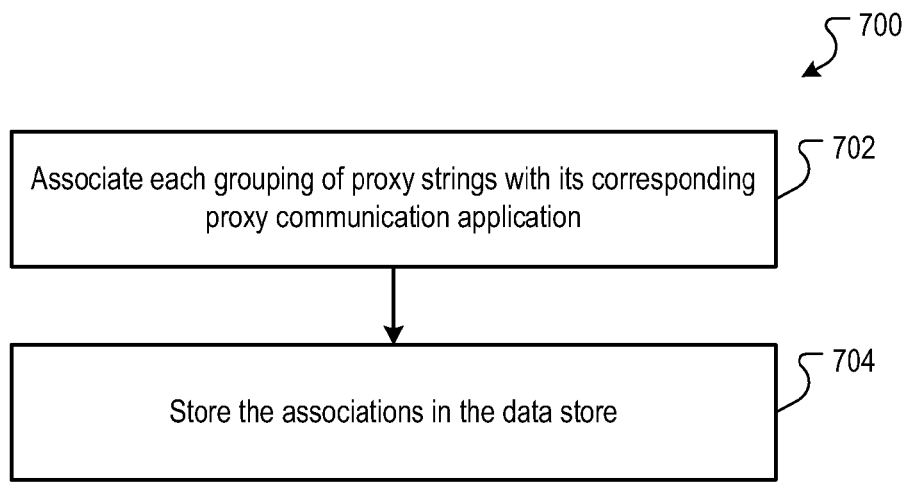
FIG. 7 is a flow diagram of an example process for associating groupings of proxy strings for use in detecting proxy communications.

FIG. 7 is a flow diagram of an example process for associating groupings of proxy strings for use in detecting proxy communications. The process 700 can, for example, be used in the proxy string generator 119 of FIG. 2, which can be used in a logging node 140 or some other processing device that can access or receive resource requests.

The process 700 associates each grouping of proxy strings with its corresponding proxy application (702). For example, the proxy string generator 119 can group two or more proxy strings identified for a proxy application into a grouping.

The process 700 stores the associations in the data store (704). For example, the proxy string generator 119 can, in addition to storing the groups of proxy strings in the proxy string detection data 125, also store the associations of proxy software in the proxy string detection data 125. These associations can be used by the proxy string processor 116B to not only detect proxy communications, but also detect the type of proxy application being used.

Figure 8:
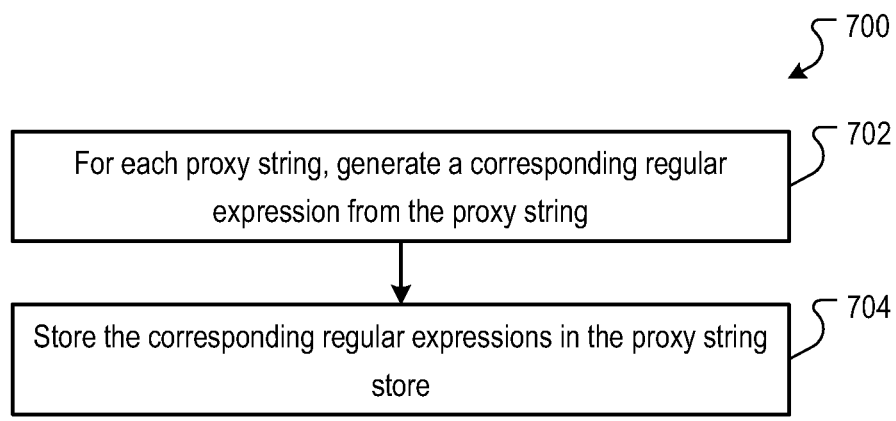
FIG. 8 is a flow diagram of an example process for generating regular expressions for use in detecting proxy communications.

FIG. 8 is a flow diagram of an example process 800 for generating regular expressions for use in detecting proxy communications. The process 800 can, for example, be used in the proxy string generator 119 of FIG. 2, which can be used in a logging node 140 or some other processing device that can access or receive resource requests.

The process 800 generates a corresponding regular expression for each proxy string (802). For example, the proxy string generator 119 can generate a regular expression "/aHR0.+/69/0/" from the proxy strings
example1proxy.com/Y29t/bXIzcGFjZQ/dXM/
aHR0cDovL2EuY29t/69/0/
example2proxy.net/Y29t/bXIzcGFjZQ/dXM/
aHR0cDovL2IuY29t/69/0/
example3proxy.net/Y29t/bXIzcGFjZQ/dXM/
aHR0cDovL2MuY29t/69/0/
example4proxy.org/Y29t/bXIzcGFjZQ/dXM/
aHR0cDovL2QuY29t/69/0/

The process 800 stores the corresponding regular expression in a data store (802). For example, the proxy string generator 119 can store the regular expressions in the proxy string detection data 125.

Figure 9:
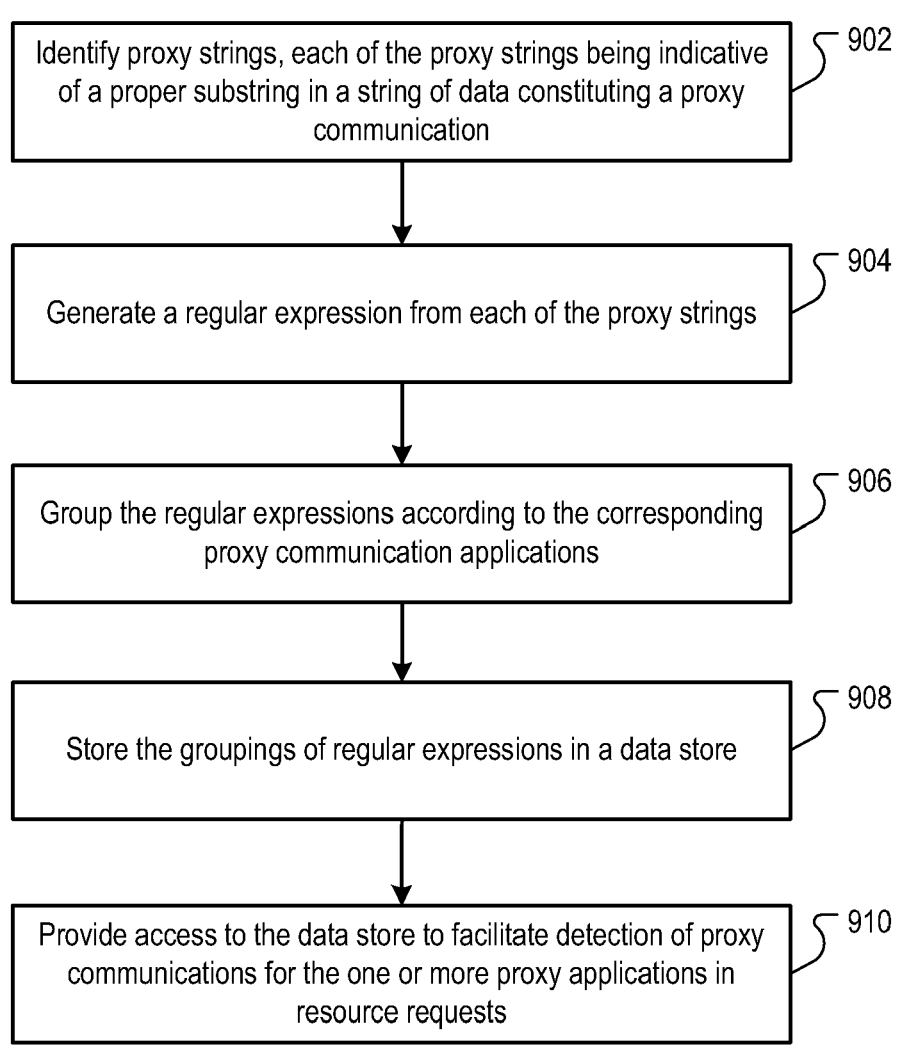
FIG. 9 is a flow diagram of an example process for identifying regular expressions for use in detecting proxy communications.

FIG. 9 is a flow diagram of an example process 900 for identifying regular expressions for use in detecting proxy communications. The process 900 can, for example, be used in the proxy string generator 119 of FIG. 2, which can be used in a logging node 140 or some other processing device that can access or receive resource requests.

The process 900 identifies proxy strings, each of the proxy strings being indicative of a proper substring in a string of data constituting a proxy communication (902). For example, the proxy string generator 119 can identify the strings
/aHR0cDovL2EuY29t/69/0/
/aHR0cDovL2IuY29t/69/0/
/aHR0cDovL2MuY29t/69/0/
/aHR0cDovL2QuY29t/69/0/
as proxy strings if a portion of the string, e.g. the prefix "/aHR0" and the suffix "/69/0/" is observed in a number of proxy communications for a proxy application that exceed a frequency threshold, e.g., present in more than 30% of all proxy communications generated by that proxy application.

The process 900 generates a regular expression for each of the proxy strings (904). For example, the proxy string generator 119 can reduce the strings above to the regular expression "/aHR0.+/69/0/".

The process 900 groups the regular expressions according to corresponding proxy applications (906). For example, the proxy string generator 119 can associate the regular expression "/aHR0.+/69/0/" and other regular expressions with a corresponding proxy application that generates proxy communications that satisfy the regular expressions.

The process 900 stores the groupings of regular expressions in a data store (908). For example, the proxy string generator 119 can store the grouped regular expressions in the proxy string detection data 125.

The process 900 provides access to the data store to facilitate detection of proxy communications for one or more of the proxy applications in resource requests (910). For example, the proxy string generator 119 can provide access to the proxy string detection data 125 by pushing the proxy string detection data 125 to the authority node 120.

The data inspection engines 116, processing node manager 118, proxy string generator 119, authority node manager 128, user interface manager 132, logging node manager 148, and authority agent 180 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. Other processing architectures can also be used, e.g., a combination of specially designed hardware and software, for example.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network, such as the Internet.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
identifying proxy strings, each of the proxy strings being a substring in a string of data constituting a Uniform Resource Locator (URL) in a proxy communication, the proxy communications being communications that are generated by processing systems executing a plurality of proxy applications, and wherein each substring corresponds to a proxy application of the plurality of proxy applications and is indicative of the corresponding proxy application, and is included in proxy communications generated by the corresponding proxy application, wherein the identifying comprises:
   identifying static strings associated with each proxy application, each static string for each proxy application being a sequence of characters included in each URL of a proxy communication generated by the proxy application; and
   generating the proxy strings based on the identified static strings;
grouping the proxy strings according to the corresponding proxy applications, each grouping of proxy strings including the proxy strings that are generated by a processing system executing a corresponding proxy application;
storing the groupings of proxy strings in a proxy string store; and
providing access to the proxy string store to facilitate detection of proxy communications for the one or more proxy applications in resource requests.

2. The method of claim 1, further comprising:
associating each grouping of proxy strings with its corresponding proxy application; and
storing the associations in the proxy string store.

3. The method of claim 1, further comprising:
for each proxy string, generating a corresponding regular expression from the proxy string, each regular expression being one or more characters defining an expression to identify one of the proxy strings; and
storing the corresponding regular expressions in the proxy string store.

4. The method of claim 1, wherein identifying static strings associated with each proxy application comprises:
receiving proxy communications from a processing system executing a proxy application, each proxy communication comprising a string of data; and
identifying the static strings in the proxy communications.

5. The method of claim 1, wherein identifying proxy strings comprises:
identifying static strings in the proxy communications, each static string for each proxy application being a sequence of characters included in a URL of a proxy communication generated by the proxy application and a frequency of occurrence that exceeds a proxy string occurrence threshold.

6. The method of claim 5, wherein the frequency of occurrence for each substring is proportional to the number of proxy communications that include the substring to the number of proxy communications that do not include the substring.

7. The method of claim 1, wherein identifying proxy strings comprises:
identifying static strings associated with each proxy application, each static string for each proxy application being a sequence of characters included in each URL of a proxy communication generated by the proxy application; and
identifying the proxy strings based on the identified static strings.

8. A computer-implemented method, comprising:
identifying proxy strings, each of the proxy strings being a substring in a string of data constituting Uniform Resource Locator (URL) in a proxy communication, the proxy communications being communications that are generated by processing systems executing a plurality of proxy applications, and wherein each substring corresponds to a proxy application of the plurality of proxy applications and is indicative of the corresponding proxy application, and is included in proxy communications generated by the corresponding proxy application, and wherein the identifying comprises identifying static strings in the proxy communications, each static string for each proxy application being a sequence of characters included in a URL of a proxy communication generated by the proxy application and having a frequency of occurrence that exceeds a proxy string occurrence threshold;
generating a regular expression from each of the proxy strings, each regular expression being one or more characters defining an expression to identify one of the proxy strings;
grouping the regular expressions according to the corresponding proxy applications, each grouping of regular expressions based on the proxy strings that are generated by a processing system executing a corresponding proxy application;
storing the groupings of regular expressions in a proxy string store; and
providing access to the proxy string store to facilitate detection of proxy communications for the one or more proxy applications in resource requests.

9. The method of claim 8, further comprising:
associating each grouping of regular expressions with its corresponding proxy application; and
storing the associations in the proxy string store.

10. The method of claim 8, wherein identifying proxy strings comprises:
identifying static strings associated with each proxy application, each static string for each proxy application being a sequence of characters included in each URL of a proxy communication generated by the proxy application; and
generating the proxy strings based on the identified static strings.

11. The method of claim 10, wherein identifying static strings associated with each proxy application comprises:
receiving proxy communications from a processing system executing a proxy application, each proxy communication comprising a string of data; and
identifying the static strings in the proxy communications.

12. The method of claim 8, wherein identifying proxy strings comprises:
identifying static strings associated with each proxy application, each static string for each proxy application being a sequence of characters included in each URL of a proxy communication generated by the proxy application; and
identifying the proxy strings based on the identified static strings.

13. Software stored in a non-transitory computer readable medium and comprising instructions executable by a processing system, and upon such execution cause the processing system to perform operations comprising:

identifying proxy strings, each of the proxy strings being a substring in a string of data constituting a Uniform Resource Locator (URL) in a proxy communication, the proxy communications being communications that are generated by processing systems executing a plurality of proxy applications, and wherein each substring corresponds to a proxy application of the plurality of proxy applications and is indicative of the corresponding proxy application, and is included in proxy communications generated by the corresponding proxy application, and wherein the identifying comprises identifying static strings in the proxy communications, each static string for each proxy application being a sequence of characters included in the URL of a proxy communication generated by the proxy application and having a frequency of occurrence that exceeds a proxy string occurrence threshold;

grouping the proxy strings according to their corresponding proxy applications, each grouping of proxy strings including the proxy strings that are generated by the corresponding proxy application;

storing the groupings of proxy strings in a proxy string store; and providing access to the proxy string store to facilitate detection of proxy communications for the one or more proxy applications in resource requests.

14. The software of claim 13, wherein the operation of identifying proxy strings comprises:

identifying static strings associated with each proxy application, each static string for each proxy application being a sequence of characters included in each URL of a proxy communication generated by the proxy application; and identifying the proxy strings based on the identified static strings.

15. Software stored in a non-transitory computer readable medium and comprising instructions executable by a processing system, and upon such execution cause the processing system to perform operations comprising:

identifying proxy strings, each of the proxy strings being a substring in a string of data constituting a Uniform Resource Locator (URL) in a proxy communication, the proxy communications being communications that are generated by processing systems executing a plurality of proxy applications, and wherein each substring corresponds to a proxy application of the plurality of proxy applications and is indicative of the corresponding proxy application, and is included in proxy communications generated by the corresponding proxy application, wherein the identifying comprises:

identifying static strings associated with each proxy application, each static string for each proxy application being a sequence of characters included in each URL of a proxy communication generated by the proxy application; and generating the proxy strings based on the identified static strings;

generating a regular expression from each of the proxy strings, each regular expression being one or more characters defining an expression to identify one of the proxy strings;

grouping the regular expressions according to their corresponding proxy applications, each grouping of regular expressions based on the proxy strings that are generated by the corresponding proxy application;

storing the groupings of regular expressions in a proxy string store; and providing access to the proxy string store to facilitate detection of proxy communications for the one or more proxy applications in resource requests.

16. The software of claim 15, wherein the operation of identifying proxy strings comprises:

identifying static strings associated with each proxy application, each static string for each proxy application being a sequence of characters included in each URL of a proxy communication generated by the proxy application; and identifying the proxy strings based on the identified static strings.

17. A system, comprising:

a data store; and a proxy string generator in communication with the data store and configured to:

identify proxy strings, each of the proxy strings being a substring in a string of data constituting a Uniform Resource Locator (URL) in a proxy communication, the proxy communications being communications that are generated by processing systems executing a plurality of proxy applications, and wherein each substring corresponds to a proxy application of the plurality of proxy applications and is indicative of the corresponding proxy application, and is included in proxy communications generated by the corresponding proxy application, and wherein the identifying comprises identifying static strings in the proxy communications, each static string for each proxy application being a sequence of characters included in a URL of a proxy communication generated by the proxy application and having a frequency of occurrence that exceeds a proxy string occurrence threshold;

generate a regular expression from each of the proxy strings, each regular expression being one or more characters defining an expression to identify one of the proxy strings;

group the regular expressions according to their corresponding proxy applications, each grouping of regular expressions based on the proxy strings that are generated by the corresponding proxy application;

store the groupings of regular expressions in the data store.

18. The system of claim 17, wherein:

the proxy string generator and the data store are integrated in a logging node in a network security system; and the logging node is configured to provide access to the data store to facilitate detection of proxy communications for the one or more proxy applications in resource requests.

19. The system of claim 17, wherein identifying proxy strings comprises:

identifying static strings associated with each proxy application, each static string for each proxy application being a sequence of characters included in each URL of a proxy communication generated by the proxy application; and identifying the proxy strings based on the identified static strings.

* * * * *